US008997636B2

(12) United States Patent
Kirby et al.

(10) Patent No.: US 8,997,636 B2
(45) Date of Patent: Apr. 7, 2015

(54) PROGRAMMABLE DEVICE AND METHOD FOR STORING FOOD

(75) Inventors: David W. Kirby, Lemont, IL (US);
Timothy A. Turcich, Orland Park, IL (US); Ronald J. Dorsten, Glenview, IL (US); Edward P. Bridgman, Bolingbrook, IL (US); Peter Rivera-Pierola, Chicago, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 605 days.

(21) Appl. No.: 12/587,827

(22) Filed: Oct. 14, 2009

(65) Prior Publication Data

US 2011/0083564 A1 Apr. 14, 2011

(51) Int. Cl.
*A47J 37/00* (2006.01)
*A47J 39/00* (2006.01)
*F24C 7/08* (2006.01)

(52) U.S. Cl.
CPC .............. *A47J 39/006* (2013.01); *F24C 7/082* (2013.01)

(58) Field of Classification Search
USPC ........... 99/331, 332, 342, 468, 467, 483, 448; 715/700
See application file for complete search history.

(56) References Cited

U.S. PATENT DOCUMENTS

| | | | |
|---|---|---|---|
| 3,982,097 A | 9/1976 | Seider et al. | |
| 5,590,586 A | 1/1997 | Ulfig et al. | |
| 5,724,886 A | 3/1998 | Ewald et al. | |
| 5,852,967 A | 12/1998 | Fortmann et al. | |
| 5,880,434 A | 3/1999 | Pinnow et al. | |
| D411,073 S | 6/1999 | Ewald et al. | |
| 5,947,012 A | 9/1999 | Ewald et al. | |
| 6,011,243 A | 1/2000 | Arnold et al. | |
| 6,119,587 A | 9/2000 | Ewald et al. | |
| 6,209,447 B1 | 4/2001 | Ewald et al. | |
| 6,358,548 B1 | 3/2002 | Ewald et al. | |
| 6,607,766 B2 | 8/2003 | Ewald et al. | |
| 6,658,994 B1 | 12/2003 | McMillan | |
| 7,376,485 B2 | 5/2008 | Salerno | |
| 7,385,160 B2 | 6/2008 | Jones | |
| 7,628,107 B2 * | 12/2009 | Vaseloff et al. | 99/468 |
| 7,971,523 B2 * | 7/2011 | Hartfelder et al. | 99/448 |
| 8,091,472 B2 * | 1/2012 | Maciejewski et al. | 99/483 |
| 2001/0045096 A1 | 11/2001 | Tatter | |
| 2005/0079895 A1 | 4/2005 | Kalenius et al. | |
| 2006/0045943 A1 | 3/2006 | Calzada et al. | |
| 2007/0251667 A1 | 11/2007 | Ewald et al. | |
| 2007/0254079 A1 | 11/2007 | Sus et al. | |
| 2007/0295325 A1 | 12/2007 | Esparza et al. | |

OTHER PUBLICATIONS

International Searching Authority, International Search Report and Written Opinion, International Application No. PCT/US2010/002735, Oct. 13, 2010.

* cited by examiner

*Primary Examiner* — Reginald L Alexander
(74) *Attorney, Agent, or Firm* — Hinshaw & Culbertson LLP

(57) ABSTRACT

An improved food storage device for holding food items in a controlled environment, typically heated, is disclosed. The device can hold different foods under different conditions for different amounts of time. Among the improvements is an intuitive programming interface. The device may be programmed by selecting different options displayed on different displays associated with different specific food storage positions by pressing a button associated with the display displaying the option. The device may have synchronized displays allowing users to more quickly assimilate displayed information.

60 Claims, 12 Drawing Sheets

PROGRAMMABLE DEVICE AND METHOD FOR STORING FOOD

TECHNICAL FIELD

This invention relates to a device and method for storing cooked food items at elevated temperatures and more particularly to a staging device for holding previously cooked food items at elevated temperatures that can be readily programmed and controlled.

BACKGROUND OF THE INVENTION

Food storage devices in which trays of precooked food items are staged at an elevated temperature pending an order for a sandwich that incorporates the staged precooked food have been successfully used in the past at quick service restaurants. Such devices are described in U.S. Pat. No. 5,724,886, for example. In practice, food storage devices were programmed by Personal Data Assistants (PDAs). However, because it was easy to lose, break or have PDAs stolen, programming by PDAs is often impractical. In addition, as with many other consumer electronics, specific models of PDAs may be discontinued and technologies change requiring the programming software to be updated and sometimes causing confusion among users of the food storage devices because the PDA has changed. Therefore, there is a need for food storage devices that can be programmed without a PDA.

While operation of food storage devices is straightforward, programming may be relatively complicated and time-consuming. In addition, if the programming is not done correctly, food items staged in the food storage devices may become dried out, soggy and generally of unacceptable quality or they may be prematurely thrown away. Thus, any new systems and methods for programming the food storage devices should be easy, quick and intuitive. The need for new food storage devices having such improved programming systems and methods is exacerbated due to the capability and need for the food storage device to typically have multiple (2, 3, 4, 5 or more) compartments, each capable of receiving three or more trays with the temperature of each compartment separately programmable and controllable, and for the elapsed storage time of each tray being readily ascertainable by a user.

In quick service restaurants, hundreds and thousands of sandwiches may be served in a day. Some of these sandwiches may be bought for only a dollar or other low price and yet the same sandwich must be served quickly and be of consistent quality. Given the sheer volume of sandwiches and the competitiveness of the quick service restaurant industry, gaining small efficiencies can significantly improve the profitability of a quick service restaurant. Thus, there is a need for improved food storage devices.

SUMMARY OF THE INVENTION

In accordance with one aspect of the present invention, a food storage device is provided for holding food items in a controlled environment. The food storage device includes a plurality of discrete food storage cavities, each storage cavity defining a food storage volume and having an associated control element for controlling the environment and the food storage volume in which food items can be held. Each storage cavity has an associated secondary input interface for programming the device and a secondary human-readable display for displaying programming menu options and for displaying a status of the storage cavity. A primary input interface is provided, discrete from the secondary input interfaces, for permitting the user to program a plurality of cavities in cooperation with the second input interfaces. In addition, the device is programmable by a hierarchy of menus comprising a plurality of the programming menu options.

In accordance with a more specific aspect of the invention, the control element is selected from a heater element, a cooling element, a humidifier, a dehumidifier, air flow, and combinations thereof. Thus, the present invention is applicable to many types of food storage devices.

In a typical embodiment, the food storage device is further composed of a cabinet that encloses the plurality of food storage cavities and the primary input interface. In one embodiment, the device may further include a plurality of removable food storage trays. Typically, the removable trays are each configured to contain an amount of food that can be placed and contained within one of the plurality of food storage cavities.

In a typical embodiment, each cavity has a plurality of tray storage positions and a cavity control button for changing a mode of the cavity.

In accordance with another aspect of the invention, the primary input interface comprises a control panel having a keypad. The keypad allows user input in programming of the food storage device in cooperation with the secondary input interfaces. This structure allows for the design and construction of food storage devices at an economical cost while having the ability to program and display information regarding a plurality of discrete food storage cavities, each cavity having a plurality of food storage tray positions. The primary input interface may also have a human-readable display. The keypad can be of any suitable type and may be, for example, a touch screen keypad or a touch screen input that, in addition, can also function as a human-readable display, if desired.

In accordance with another aspect of the food storage device, a master query button or control is provided that is linked to the primary input interface and the associated secondary input interfaces so that pressing or activating the master query button causes the secondary displays to display a status for their corresponding storage positions. The status can be as desired and may be, for example, elapsed time of storage, temperature, food type or other information as desired, including but not limited to time remaining for food storage in a particular storage position, a setting for the environmental control element and the environmental condition controlled by the environmental control element (i.e., temperature, humidity, air flow, other parameters and combinations thereof).

Typically, all of the device functions, input interfaces, displays and control elements of the devices of the invention will be associated with and controlled by one or more microprocessors.

In accordance with another aspect of the invention, the food storage device is easily programmable by a human operator in which the primary input interfaces and secondary input interfaces are utilized. In accordance with one aspect of the invention, the food storage device is programmed by selecting one of a plurality of menu options displayed by the secondary displays which are programmed to display different menu options. Selecting one of the menu options can include making an input via one of the secondary input interfaces corresponding to the secondary display displaying the selected menu option. Typically, each of the secondary input interfaces will comprise a control button and making an input via the secondary input interface is accomplished by a human operator pressing a button, which may be an individual button or part of a keypad.

In accordance with another aspect of the invention, only the control button or buttons that are available to be pressed for making a user input are illuminated, backlighted or highlighted in order to facilitate programming of the device in a logical and expedient manner.

In accordance with another aspect of the invention, each of the storage cavities has a separate light associated therewith, typically located adjacent the control button. The device is configured so that the light can be eliminated responsive to the display of a menu option by the corresponding secondary display. The light may also have bright, dim and off levels to indicate a desired functionality, which may be, for example, "bright" requiring action as to the associated storage location such as to cook more food or to discard food contained therein, for example, "dim" requires no action but is programmed to store food and "off" means that the associated storage location has not been programmed to store food, for example.

In accordance with another aspect of the invention, the hierarchy of menus is composed of a first menu having a first meal mode menu option and a second meal mode menu option, the first and second meal mode menu options each being selected from the group consisting of breakfast items, lunch items, dinner items and combinations thereof.

In accordance with another aspect of the invention, appropriate displays are provided that are incorporated into the food storage device. Typically, a primary display will be located adjacent the primary input interface, the primary input interface displaying a status of the device on the primary display. In addition, typically a separate secondary display will be provided and associated with each one of the plurality of tray positions of the food storage device. In a typical configuration, the primary and secondary displays are used for displaying alphanumeric characters and the number of characters of the primary display will be more and in some embodiments substantially more, such as two or three times more, characters than can be displayed on each of the secondary displays. Such an arrangement facilitates the economical construction of food storage devices in accordance with the present invention.

In accordance with another aspect of the invention, the food storage device in accordance with the invention further includes a countdown timer function. The countdown timer function permits a human operator to view in one or more of the secondary human-readable displays information concerning storage time of food items held within a specific food storage volume or location. The food storage time information may consist of elapsed storage time, time remaining on the usable life of the food product, or some other time-related display.

In accordance with another aspect of the invention, the hierarchy of menus can include a first menu, a second menu, one or more of the menus including a name for each food item and an environmental control element setting for each food item and an allowable storage period for the countdown timer.

In accordance with another aspect of the invention, a method for programming a food storage device is provided. The food storage device may be as previously described, having a plurality of food storage cavities, each cavity having at least one food storage position, an associated environmental control element for controlling the environment in the cavity, a primary input interface having a first key, a secondary display and a secondary key. The method includes displaying different menu options from a hierarchy of programming menus on different secondary displays and selecting a menu option by pressing the secondary key associated with the cavity having the secondary display displaying the menu option. The method may further include illuminating the secondary key of the associated cavity having secondary displays displaying menu options responsive to the display of the menu options. The method may still further include providing a second menu for programming a cavity to hold a food item therein under a specified environment for a specified period of time, the hierarchy of menus having the second menu, the second menu comprising the following menu options: an identifier for the item to be held, a condition control element setting for the item and a time for a timer for a food storage position and selecting the first or second menu by pressing the primary key.

In accordance with another aspect of the programming methods of the present invention, a third menu is provided that has more menu options than secondary displays, the hierarchy of menus having the food menu and displaying different menu options from a hierarchy of programming menus on different secondary displays, and the method comprises displaying different menu options of the third menu and illuminating the first key in response to displaying the third menu, pressing the first key and displaying a previously non-displayed option from the third menu on one of the secondary displays in response to pressing the first key.

In accordance with still another aspect of the invention, a food storage device is provided for holding food items in a heated environment. The food storage device includes a plurality of discrete food storage cavities, each storage cavity defining a food storage volume and having a heating element for heating the environment in the food storage volume in which food items can be held. Each storage cavity has an associated secondary input interface for programming the device and a secondary human-readable display for displaying a programming menu option and for displaying a status of the storage cavity. The food storage device further includes a primary input interface, discrete from the secondary input interfaces, for permitting the user to program the plurality of cavities in cooperation with the secondary input interfaces. The food storage device is programmable by a hierarchy of menus comprising a plurality of the programming menu options.

In accordance with another aspect of the invention, the device is programmable by selecting one of the menu options from different menu options displayed on the different secondary displays.

In accordance with another aspect of the invention, the food storage device is configured so that the secondary input interfaces comprise a control button permitting selecting one of the menu options by pressing the control button. The control buttons can be in the form of a touch screen that also functions as a human-readable display, if desired.

In accordance with another aspect of the invention, the food storage device is capable of indicating the need to cook more food items when food items have been held in the device for a time approaching or exceeding a maximum hold time for the food items. In accordance with still another aspect of the food storage device in accordance with the invention, each cavity includes at least one storage position and each storage position is programmable to hold a specific food item type for a specific time duration with the device capable of indicating the need to cook more of the food item type upon expiration of a predetermined amount of time.

In accordance with another aspect of the invention, the device is capable of indicating the need to cook more food of the food item type stored in a particular storage position upon expiration of a predetermined amount of time by displaying a COOK MORE message on the secondary human-readable display that is associated with the storage position that holds the food for which there is a need to cook more. In addition, the device is capable of displaying the COOK MORE message on a plurality of the secondary human-readable displays for each storage position having that condition (the need to cook more food for the type that is held in the respective storage position). The device is capable of displaying each of the COOK MORE messages for the respective storage positions having that condition in synchronicity, that is, at the same time. Alternatively, the secondary human-readable displays associated with the individual storage positions having the need to cook more food could be controlled such that the COOK MORE message is displayed in a sequence, instead of at the same time. The sequence could be, for example, from top to bottom or in a horizontal direction, such as from left to right or from right to left relative to the relative location of the various storage positions having the need to cook more condition.

In accordance with still another aspect of the invention, the food storage device comprises a plurality of food storage cavities, each cavity having at least one food storage position, the device programmable to hold a specific food item type for a specific time duration for each storage position, and when a plurality of food storage positions hold the same type of food, the device is capable of indicating on a first-in-first-out basis from which storage position that type of food should be removed.

In accordance with another aspect of the invention, the device is capable of indicating an expired status for food items that have been held in a food storage position for longer than a maximum hold time by displaying an EXPIRED message on the secondary human-readable display associated with that storage position holding the food items that have time-expired. The device is capable of displaying each of the EXPIRED messages for the respective storage positions having that condition in synchronicity, that is, at the same time. Alternatively, the secondary human-readable displays associated with the individual storage positions holding the food items that have time-expired could be controlled such that the EXPIRED message is displayed in a sequence, instead of at the same time. The sequence could be, for example, from top to bottom or in a horizontal direction, such as from left to right or from right to left relative to the relative location of the various storage positions holding the time-expired food items.

DETAILED DESCRIPTION OF THE INVENTION

Figure 1:
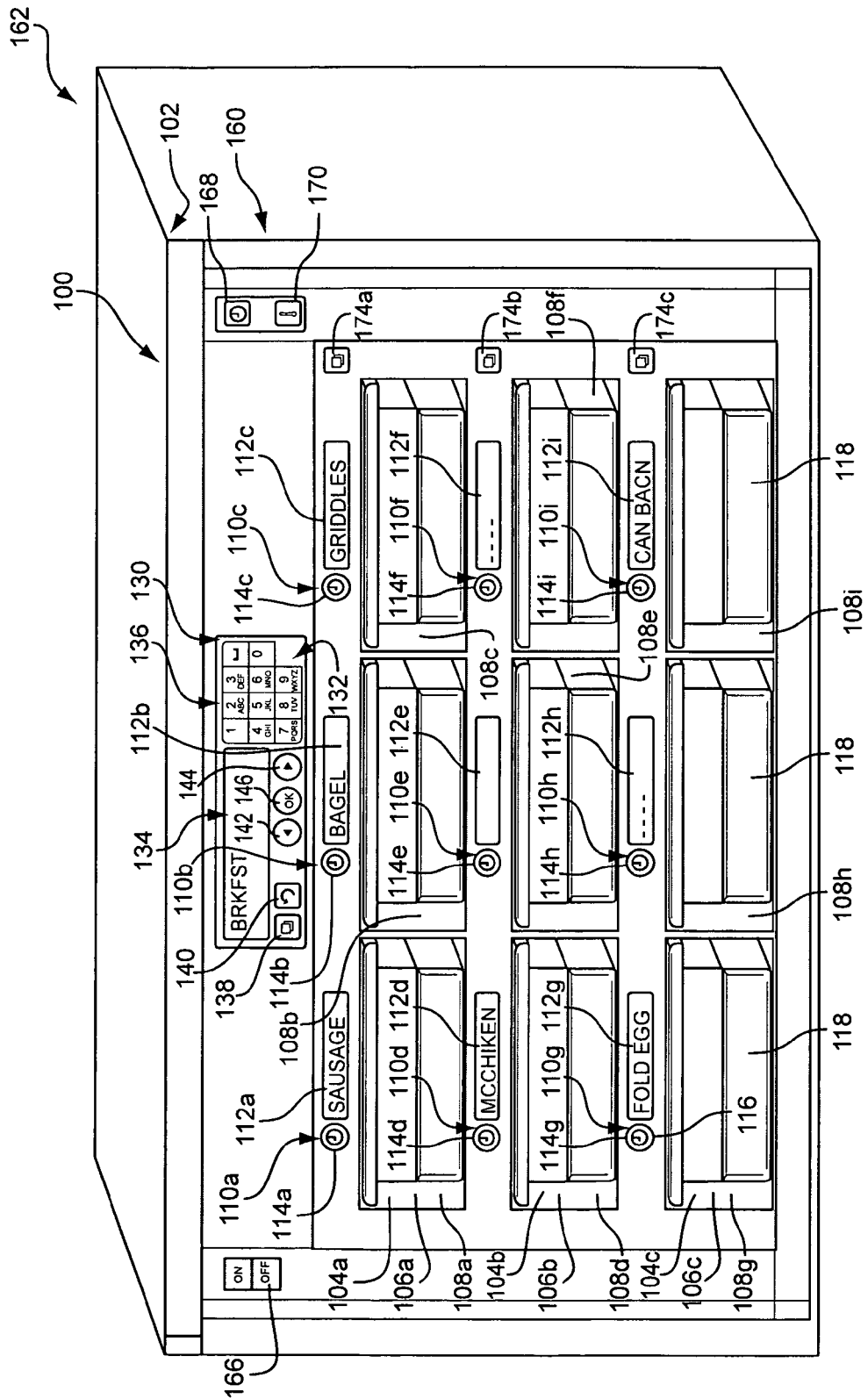
FIG. 1 is a perspective front view and FIGS. 2-3 show front elevation views, of a food storage device of the invention in breakfast, changeover and regular modes, respectively.
Figure 2:
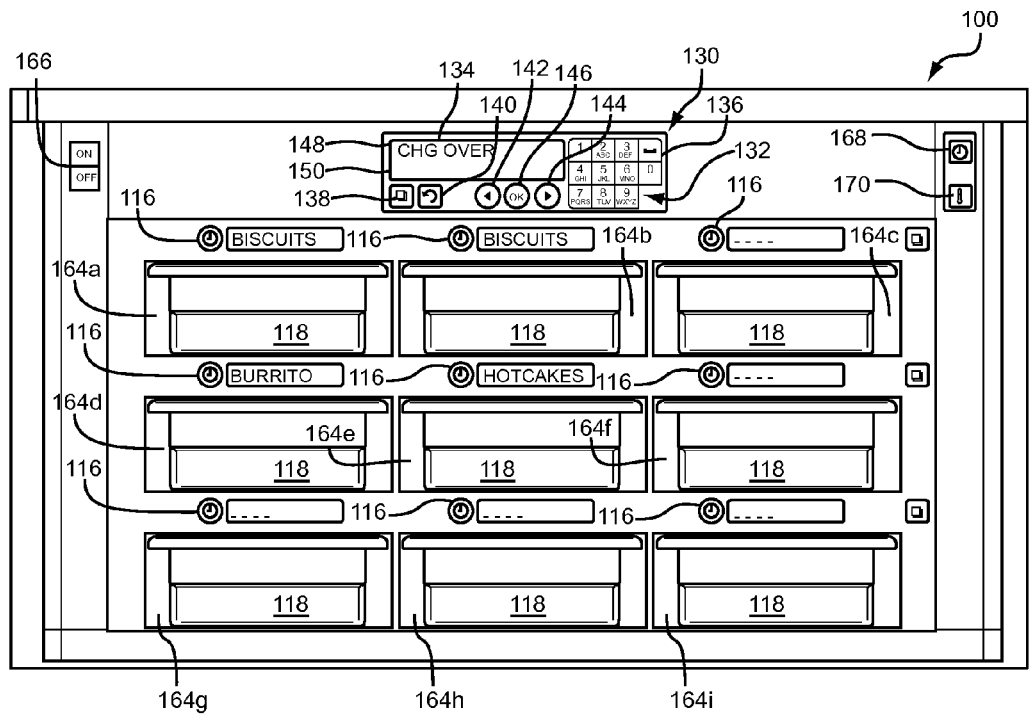

Referring to the Figures generally and in particular to FIGS. 1-2, one embodiment of the invention is illustrated as a food storage device or holding cabinet 100 provided for holding food items in a controlled environment. As will be described in detail below, device 100 has food storage cavities 104a-c, a primary input interface 132, a primary display 134, master query keys 168 and 170, all housed in a cabinet 102, and which encloses device 100.

Device 100 has food storage cavities 104a, 104b and 104c as shown in FIG. 1. Storage cavities 104a-c define food storage volumes 106a-c, respectively. Typically, each storage volume can be used for retaining a respective storage tray or trays. As shown in FIG. 1, food storage volumes 106a-c each have three storage positions 108a-108i. The number of cavities 104 and storage positions 108 can be any number as desired and typically will be a plurality of each to obtain the maximum benefits of the invention. Typical configurations include six cavities 104, each having a single storage position 108, aligned in a column; six cavities 104, each having three storage positions 108, aligned in three columns; or three cavities 104a-c, each having three storage positions 108, aligned in three columns as shown in FIG. 1. It is to be understood that any number of cavities in accordance with the invention can be utilized and configured as desired. Typically, there will be at least one cavity having at least two storage positions. As illustrated, each of cavities 104a-c is a passthrough cavity, that is, it is open at both ends. Alternatively, for example, cavities may be open at one end.

Storage cavities 104a-c have associated secondary input interfaces 110a-110i and associated secondary human-readable displays 112a-112i. Typically each storage position 108a-i has an associated secondary input interface 110a-i and an associated secondary human-readable display 112a-i, but this is not required. Interfaces 110a-i and displays 112a-i may be arranged in the same row and column pattern as storage positions 108a-i as shown in FIG. 1, for example.

Secondary input interfaces 110a-i are for programming the device and for initiating a timer function associated with a respective storage position 108a-i. The timer may be a stopwatch style timer which begins at 0 and increases with time or a countdown timer which begins at a positive non-zero number and counts down. The timer may be implemented by computer code operating on a microprocessor associated with a clock. Each interface 110a-i has a button 114a-i and a separate light (not shown) associated with each button 114a-i. As shown in FIG. 1, light 116 is behind button 114 so as to illuminate button 114 from behind, preferably with dim and bright illumination levels, and in amber, as well as a light off level, which can be indicative of a food storage position that has not been programmed. Button 114 has a translucent surface allowing light from light 116 to shine through button 114. Button 114 may be a tactile push button and alternatively may be part of a touch screen or any other suitable button.

Each secondary display 112a-i is for displaying a status of a respective associated cavity 104a-c and/or associated storage position 108a-i and for displaying programming menu options. For purposes of this disclosure, associated means related or corresponding to the same storage position or storage cavity. For example, in FIG. 1, display 112a is associated with storage position 108a because display 112a displays the status "sausage" of storage position 108a. Displays 112a-i may each be an 8-character, 17 segment alphanumeric, green character display, for example. To be able to draw user attention to information provided at one display 112a-i versus another, each of displays 112a-i may have high contrast, high brightness and bright and dim illumination capabilities. Alternatively or in addition, to further highlight some displays 112a-i versus others, each of displays 112a-i may be able to display urgent status messages in red or have a light pipe around the display areas. As an alternative to having one respective display 112a-i per storage position 108a-i, when, as illustrated, one of cavities 104*a-c* has multiple storage positions 108*a-i*, an alternative embodiment is for one or more of cavities 104*a-c* to have a single display, such as only one of displays 112*a-i* associated with it and a selector button for each corresponding storage position to individually display the status of a selected one of the storage positions, such as storage positions 108*a-c*, for example. Alternatively, the display could be elongated in a manner to allow a status to be displayed adjacent each storage position 108*a-i*.

Storage volumes 106*a-c* may hold a respective one of removable storage trays 118 at positions 108 *a-i*. Typically storage trays 118 are identical, although different types of trays can be used for different types of foods as desired. Generally, a given storage tray 118 holds only a single type of food item while in device 100 because the time and holding conditions can vary significantly among food item types. Storage trays 118 may be of the type described in US Patent Application Publication Nos. 2006/0045943 and 2007/0254079. Storage trays may also be color coded according to food item types. Storage trays 118 may be of a sufficient length so as to substantially extend through cabinet 102. Typically, the tray volume in which the food is stored does not extend beyond the storage cavity, such as storage cavities 104*a-c*.

Storage cavities 104*a-c* have an associated control element for controlling the environment in the food storage volume in which food items can be held. Typically, the control element includes a control element selected from the group consisting of a heater element, a cooling element, a humidifier, a dehumidifier, air flow, such as into and out of or through a cavity, and combinations thereof. Preferably, there is a top and bottom electric resistive heater element (not shown) for each storage position 108 providing substantially uniform temperatures along the food-holding length of tray 118. Preferably, the heater elements are selected and sized to maintain food items at 140-200° F. Typical storage temperatures for items being kept warm are about 160° F. for biscuits; about 170° F. for hamburger patties, grilled chicken, eggs, Canadian bacon, pork sausage, and muffins; and about 200° F. for breaded items and hotcakes. Suitable sensors (not shown) as are known to those skilled in the art can be used to measure temperature, humidity or any other desired parameter.

Figure 20:
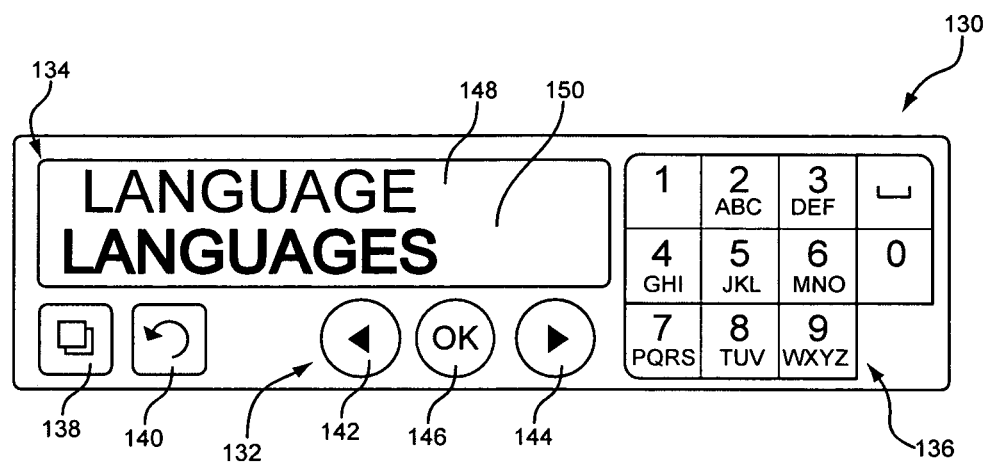
FIG. 20 shows the primary input interface of the food storage device.

Device 100 has a primary control panel 130, as shown in FIG. 20. Control panel 130 has a primary input interface 132 for permitting a user to program device 100 with respect to the plurality of cavities in cooperation with secondary input interfaces 110 and a primary display screen 134. Primary input interface 132 has a keypad 136 for entering alphanumeric information, a key 138 for entering into a programming mode for device 100, a key 140 having a back indicator marked thereon, keys 142 and 144 marked with left and right arrows respectively, and a key 146 bearing an OK designation. The keypad can be any desired form, and can be a touch screen type keypad as well as a virtual keypad on a screen and alternatively can be a plurality of buttons or other input devices to allow the desired human-user input into device 100. Primary display screen 134 is human readable and has a top line 148 and a bottom line 150 as shown in FIGS. 2 and 20. Preferably lines 148 and 150 are 12 characters long and display 134 is a 17-segment alphanumeric display and thus can display three times as many characters as secondary displays 112*a-i*. Display 134 preferably has high contrast, high brightness, and bright and dim illumination levels. Preferably, display 134 is capable of displaying in green. Control panel 130 includes or has associated with it and typically contained within and forming a part of food storage device 100, a suitable microprocessor or microprocessors (or a microcontroller or other electronic device that can be programmed) (not shown) to carry out all of the control functions of food storage device 100 as described herein. Secondary input interfaces 110*a-i* and secondary displays 112*a-l*, master query keys 168 (master time button) and 170 (master temperature button) and the environmental control elements (not shown), which may be, for example, one or more heating elements, humidifiers, cooling devices, air flow devices or other environmental control devices, sensors and associated equipment that may be used, such as with respect to one or more of food storage cavities 104*a-c*, are also associated with and controlled by the microprocessor. Such microprocessors, microcontrollers and their configuration, interfacing with other equipment, programming and use are well known in the art. Consequently, a description of how to program and use the microprocessor is not provided herein.

Device 100 has a front 160 and an opposed back 162. Front 160 has a openings 164*a-i* through which trays 118 may be inserted or removed from storage positions 108*a-i*, respectively. Preferably, the back side also has an opening for each of storage positions 108*a-i* so that trays 118 may be inserted through or removed through the back side from storage positions 108*a-i*.

Front side 160 has a power button 166, a time master query button 168 bearing a clock indicator and a temperature master query button 170 bearing a thermometer indicator. Back side 162 may be identical to front side 160, having the same arrangement of buttons and displays but back side 162 preferably does not have control panel 130 and power button 166.

Figure 3:
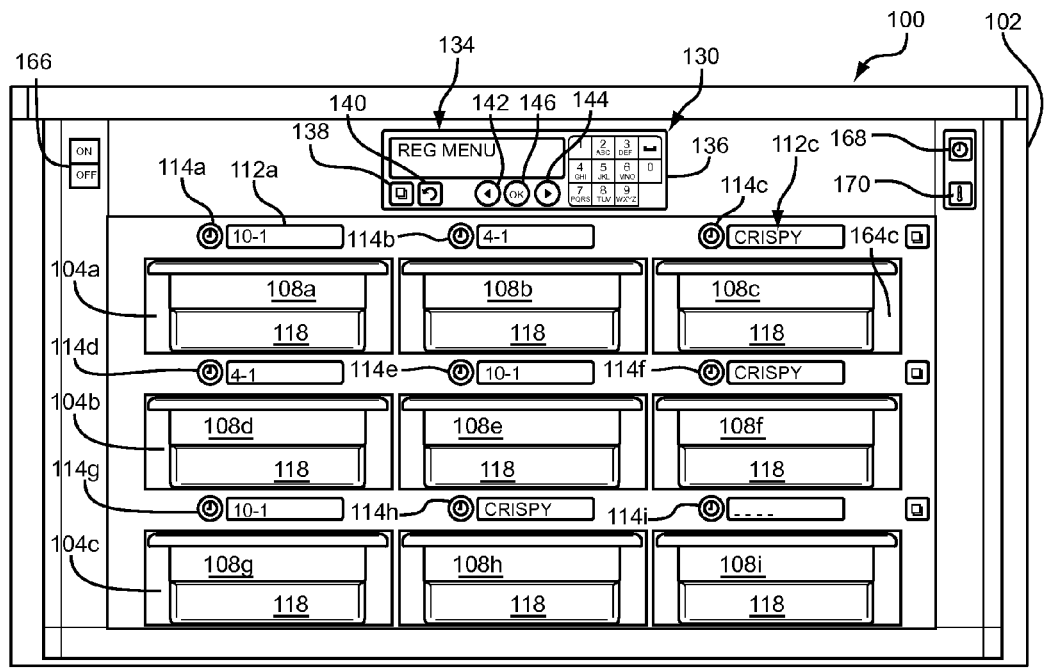
Figure 5:
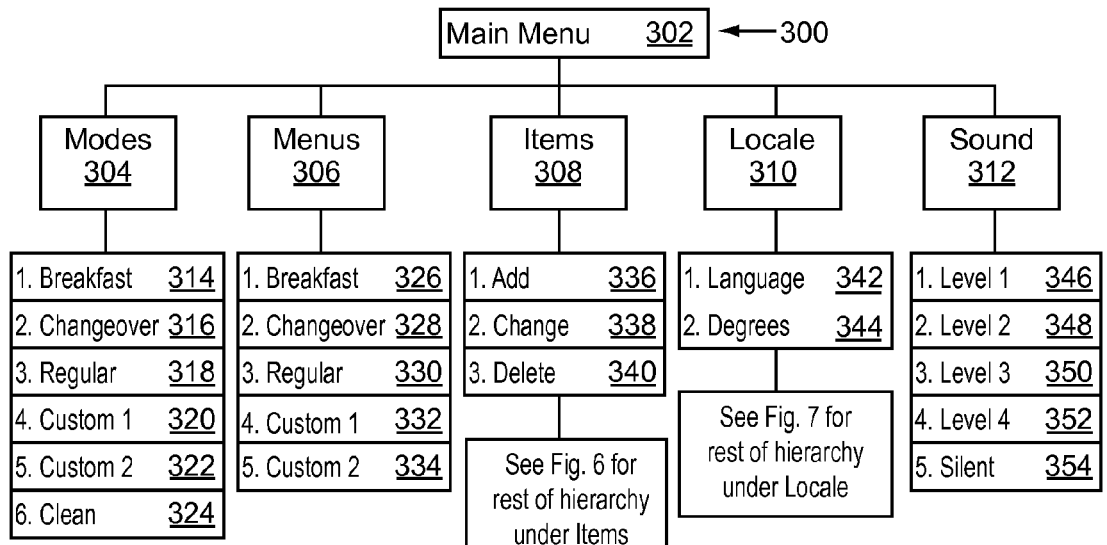
FIG. 5 shows the top two levels of menus for programming the device of the invention.

Device 100 has various operating modes. Device 100 has a breakfast mode, a changeover mode, and a regular mode as shown in FIGS. 1-3, respectively. As shown in FIGS. 1-3, line 148 of primary display 134 indicates the mode or status of the device by "BRKFST," "CHG OVER" and "REG MENU" identifiers. In addition, as shown in FIG. 5, device 100 may also have "Custom 1," "Custom 2" and "Clean" modes. Custom 1 and Custom 2 modes can be programmed as desired for holding specific or general types of food; as desired. Any number of custom modes and custom menus can be utilized as desired. In Breakfast mode, device 100 is intended to hold food items that are on or are used to make items on a breakfast menu of a quick service restaurant. For example, as shown in FIG. 1, in breakfast mode, storage position 108*b* is programmed to hold bagels and associated secondary display 112*b* indicates the status of storage position 108*b* as "BAGEL." In regular menu mode, device 100 is meant to hold food items that are on or are used to make items on a regular menu of the quick service restaurant. As shown in FIG. 3, in regular menu mode, storage position 108*c* is programmed to hold crispy chicken patties and associated secondary display 112*c* indicates the status of storage position 108*c* as "CRISPY."

The operation of device 100 in one embodiment will be explained with reference to FIGS. 4A-4H. It is to be understood that any desired combination of illumination intensities and backlighting can be used as desired, such as for displays 112 and 134, buttons 114, and can vary over time and in frequency, as well as being synchronized or non-synchronized as to different food storage positions 108, for example. Similarly, any desired word, symbol, numerals, or alphanumeric character and/or symbol combination may be used as desired for display on displays 112 and 134. Message displays of characters and/or symbols may be displayed, including those that are larger and shorter than the size of the display by scrolling the message. In addition, it is to be understood that words, phrases and symbols may be abbreviated and/or truncated as desired. FIGS. 4A-4H illustrate button 114 and associated secondary display 112 during operation. FIGS. 4A-4H and FIGS. 5-20 employ bolding to illustrate greater illumination intensities. For example, "BISCUITS" is bolded in FIG. 4F but not in FIG. 4E to illustrate that the illumination of "BISCUITS" is greater in FIG. 4F than in FIG. 4E. Similarly, button 114h is not bolded in FIGS. 4A-4B, bolded in FIGS. 4C-4F, and "extra" bolded in FIG. 4G to illustrate no back illumination, dim back illumination, and bright back illumination, respectively. For sake of convenience, the secondary display in FIGS. 4A-4H will be referred to as 112h, but the discussion that follows is equally applicable to the other secondary displays and their associated components, e.g., storage positions 108, cavities 104, and secondary input interfaces 110.

Figure 4A:
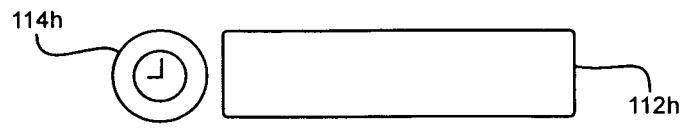
FIGS. 4A-4H show the secondary input interface and secondary display.
Figure 4B:
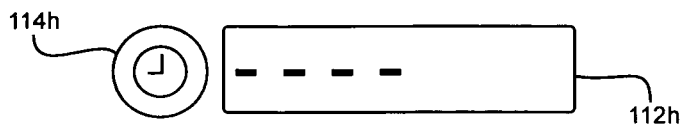
Figure 4C:

When storage position 108h is off (because device 100 or cavity 104c was turned off), associated button 114h and associated secondary display 112h are not illuminated as shown in FIG. 4A. If device 100 and cavity 104c are turned on and storage position 108h is not programmed, associated button 114h is not illuminated and associated secondary display 112h displays dashes and is dimly lit as shown in FIG. 4B. A storage position may be programmed in regular menu mode to hold a specific food item, but have no items assigned to it in a breakfast menu mode. If storage position 108h is programmed to hold biscuits in breakfast mode and storage position 108h is in breakfast mode, secondary display 112h will display an identifier for biscuits (or whatever item storage position 108h is programmed to hold). If, in addition, storage position 108h is not being used to hold food items, associated button 114h is not illuminated and secondary display 112h is dimly lit as shown in FIG. 4C.

Figure 4D:

When a user places tray 118 of biscuits, for example, into storage position 108h, the user presses associated button 114h to initiate the associated timer, which is typically a countdown timer. The countdown timer starts at a given value that is typically specific to the item being stored. Repeated presses of associated button 114h decreases the countdown timer by a given increment, such as five minute increments. For a given time interval after button 114h was pressed, (5, 8 or 10 seconds, for example) secondary display 112h will display an identifier, typically truncated, for the food being held ("BISCU" for biscuits) and the time remaining in minutes on the timer as shown in FIG. 4D. While storage position 108h is holding food that is suitable for use, generally button 114h is dimly illuminated.

Figure 4E:
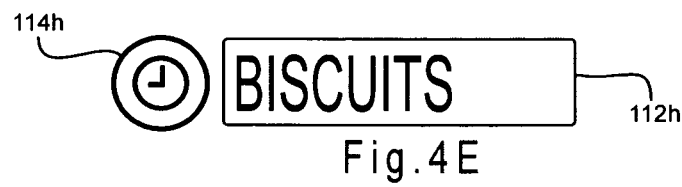
Figure 4F:

Display 112h is brightly illuminated as shown in FIG. 4F if associated storage position 108h is the only one holding the specific item type or if associated storage position 108h has the least amount of time available, e.g., the lowest amount of time on the countdown timer, among storage positions 108 holding the same food item type, otherwise display 112h is dimly lit as shown in FIG. 4E.

Figure 4G:
Figure 4H:
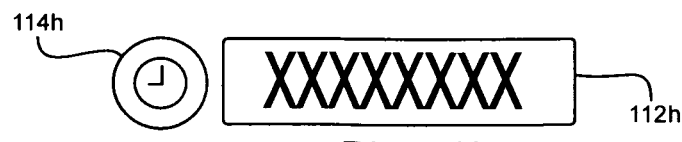

When the countdown time has expired, button 114h is not illuminated and display 112h alternates between displaying an identifier for expired status, which may be "XXXXXXXX" with bright illumination as shown in FIG. 4H, and being blank as shown in FIG. 4A. Display 112h may flash "XXXXXXXX." For example, display 112h may alternate between displaying "XXXXXXXX" for about 1, 2 or 3 seconds and may be blank for about 1, 2 or 3 seconds. Alternatively, "XXXXXXXX" can be flashed by alternating the illumination intensity of the "XXXXXXXX" (between none, dim and bright for example) or the backlighting of display 112h (between none and some, for example). If the timers for multiple storage positions 108 are lapsed at the same time, preferably the corresponding displays will display "XXXXXXXX" in synchronicity. For an example of alternative messages, "EXPIRED" could be used in place of "XXXXXXXX".

A worker will then remove and dispose of the remaining food items and press associated button 114h to return storage position 108h to an inactive, but programmed state as shown in FIG. 4C. A worker may also press button 114h when all the food in storage position 108h is used to return storage position 108h to an inactive, but programmed state as shown in FIG. 4C.

Before the countdown timer has lapsed, secondary display 112h may indicate that it is time to cook more food items. When the countdown timer drops below a given amount that is representative of the time required to cook a batch of new food items, the "cook now" time, secondary display 112h may alternate between the item identifier "BISCUITS" as shown in FIG. 4F and the status message "COOK NOW" or "COOK MORE" as shown in FIG. 4G. In addition to the alternating display of "COOK NOW" or "COOK MORE", display 112h may be backlit and button 114h may alternate between being non-illuminated, dimly illuminated and brightly illuminated. Alternatively, button 114h may be constant dim, bright or not lighted, as may be desired. If there is another storage position 112 that has biscuits and has more time on the countdown timer, secondary display 112h may or may not indicate that it is time to cook more food items.

When the timers for two or more storage positions 108 have reached the COOK NOW time, preferably corresponding displays 112 may alternate between displaying "COOK NOW" or other desired relevant message and an item identifier in synchronicity. For example, corresponding displays 112 may indicate "COOK NOW" at the same time. In addition, corresponding buttons 114 may be non-illuminated, dimly illuminated and brightly illuminated at the same time. The corresponding displays may display an identifier for the food item for about 1, 2 or 3 seconds, for example, and may display "COOK NOW" for about 1, 2 or 3 seconds, for example. Corresponding buttons may be non-illuminated, dimly illuminated or brightly illuminated for about 1, 2 or 3 seconds at a time. Preferably, displays 112 cycle through displaying "COOK NOW" and the item identifier on a different cycle than displays 112 cycling through displaying "XXXXXXXX" and a blank screen. Synchronizing the display of the "COOK NOW" and "XXXXXXXX" alerts on different cycles is believed to allow the users of device 100 to more quickly understand the alerts and to determine which alerts apply to which storage positions 108. Non-synchronization, in general, is believed to be distracting to users delaying the assimilation of information.

Device 100 can have a mixed mode. A mixed mode occurs when at least one of the storage positions 108 or cavities 104 are in a different mode than the others. A mixed mode can occur when a mode button 174a-c is used to change the mode of associated cavity 104a-c, respectively. For example, pressing mode button 174a repeatedly causes the associated secondary display 112a to display identifiers for different modes such as breakfast menu, change over, regular menu, custom, off and cleaning modes. Thus, row mode button 174a-c can be used to turn off the respective cavity. Pressing OK button 146 causes the mode of associated cavity 104a to change to the displayed mode. However, a mode change may not become fully effective until all storage positions 108 affected by the mode change are inactive. Preferably, a mode change becomes effective immediately for storage positions 108 with inactive timers.

Figure 8:
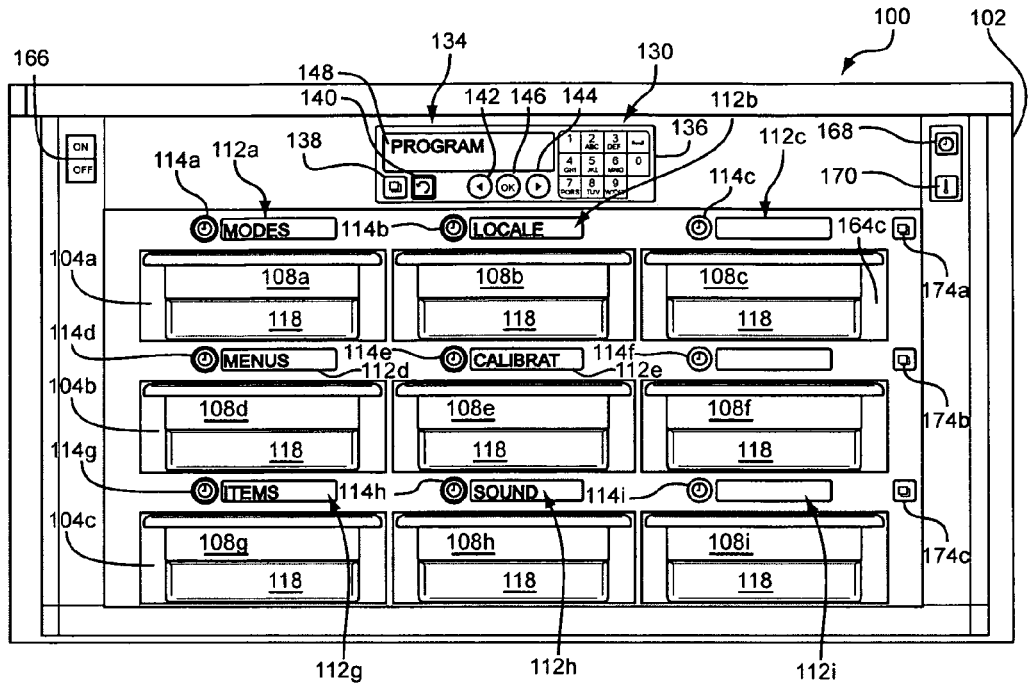
FIGS. 8-19 show front elevation views of the food storage device in various stages of the programming mode.

To initiate programming of device 100, master program button 138 on master control panel 130 is pressed, which causes device 100 to enter into programming mode. Alternatively, device 100 may have a security feature which prevents access to the programming mode without first entering a secret access code. Programming of the system then generally consists of navigating a hierarchy of menus 300 and assigning values to selected variables. As shown in FIG. 8, when first entering into programming mode, top line 148 will then display brightly "PROGRAM" to indicate the device is in programming mode, button 140 is brightly illuminated, secondary displays 112a, 112b, 112d, 112e, 112g and 112h display menu options brightly, and associated buttons 114a, 114b, 114d, 114e, 114g and 114h are brightly illuminated. During programming mode, secondary displays 112 display menu options to be selected and associated buttons 114 are brightly illuminated as well as the keys of control panel 130 that are effective at that time in programming device 100. Thus, in accordance with this embodiment, buttons are illuminated at the times they are available to make a programming input. This facilitates programming as it provides a visual cue to the user of buttons that are available to make programming inputs or choices. Generally, programming key 138 is not illuminated, however. Pressing programming key 138 while in programming mode causes device 100 to exit programming mode, generally.

Figure 7:
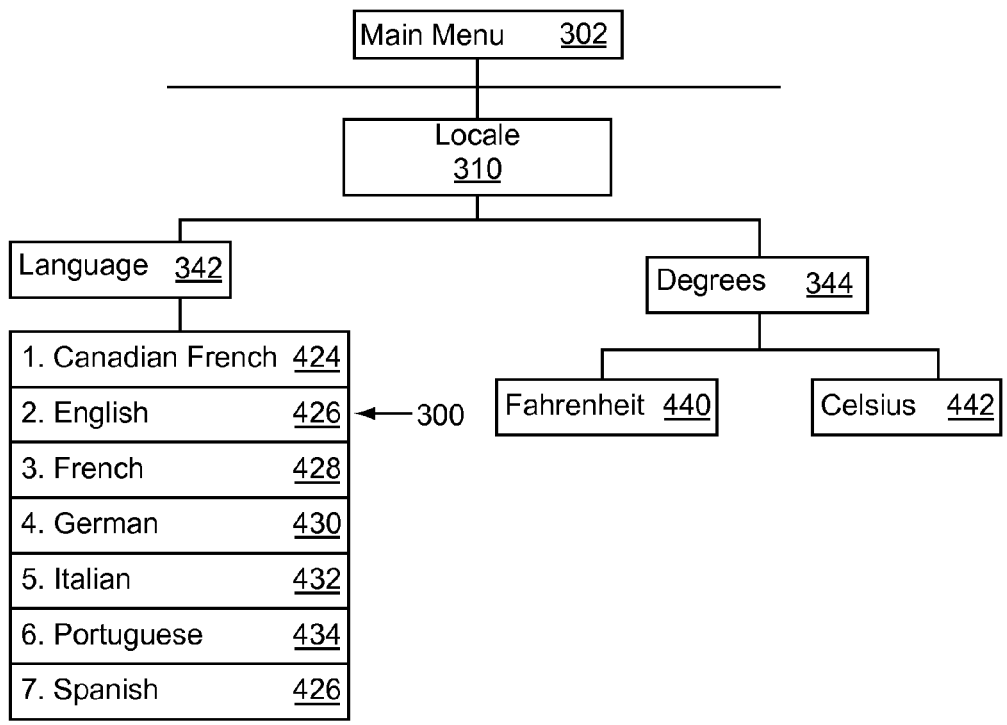
FIGS. 6 and 7 show a portion of the hierarchy of programming menus including three levels of menus.
Figure 6:
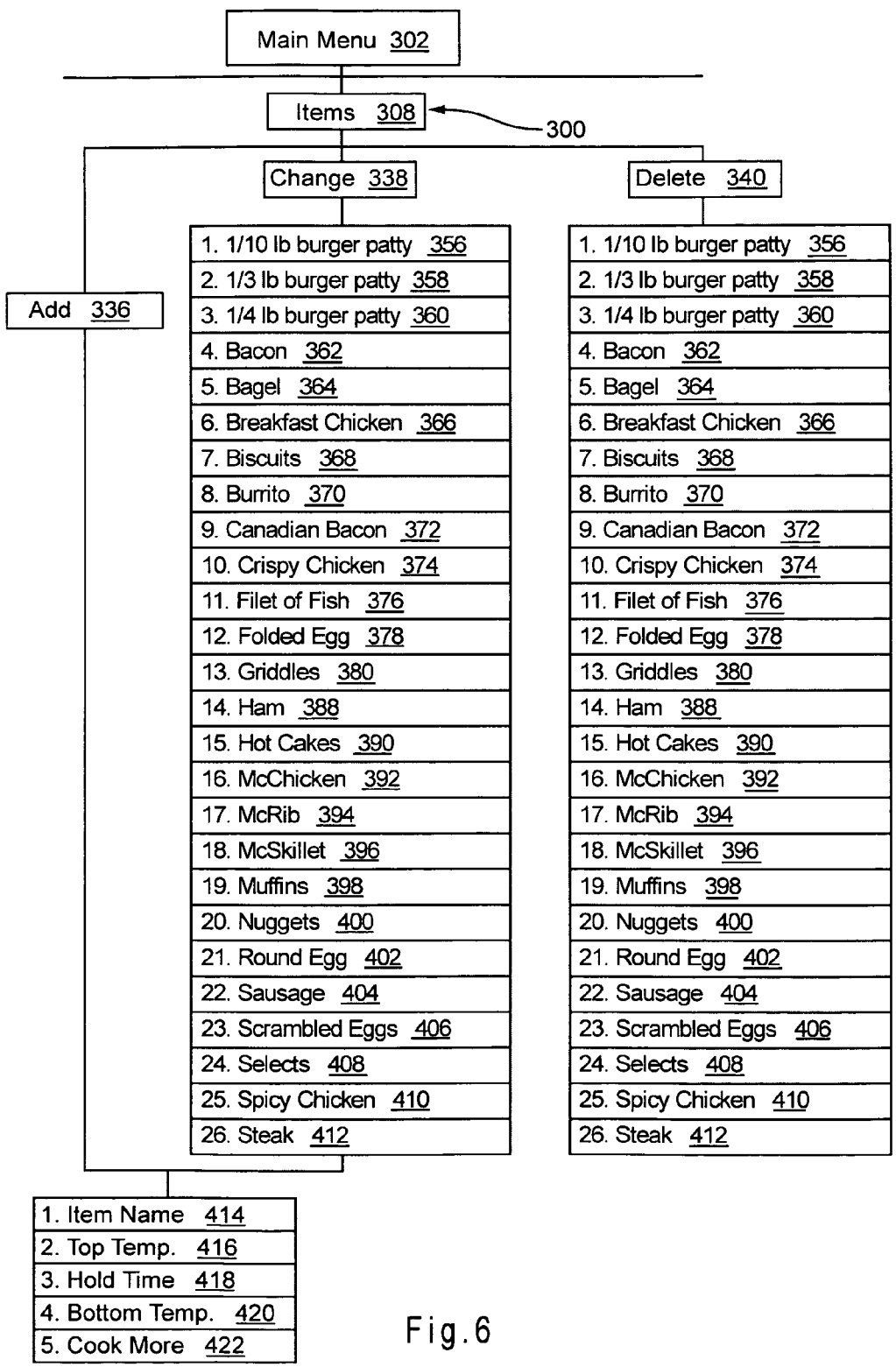

Hierarchy of menus 300 is shown in FIGS. 5-7. A main menu or first level menu 302 is the first menu encountered in programming mode. It is to be understood that in one embodiment of the invention any of the lists and the items set forth in FIGS. 5-7 can be supplemented, deleted, or modified as desired. Thus, device 100 can be used to identify and store food products as desired. Main menu 302 has the following menu options: Modes 304, Menus 306, Items 308, Locale 310 and Sound 312. Main menu 302 may also have a calibration menu option, as shown in display 112e in FIG. 8. To select an option, the corresponding button 114 is pressed. Generally, displays 112 not showing menu options are blank and their corresponding buttons 114 are not illuminated. The purpose of Modes menu 304 is to change the operating mode of device 100 from breakfast to changeover in the late morning or from regular menu mode to clean mode at the end of the day, for example. The purpose of Menus menu 306 is to assign specific food items to storage positions 108 for the various operating modes. The purpose of Items menu 308 is to provide general programming for different food items. The purpose of Locale menu 310 is to change the language and units for temperature used by device 100. The purpose of Sound menu 312 is to change the volume of device 100. Selecting menu options 304, 306, 308, 310 or 312 opens a second level menu.

Figure 9:
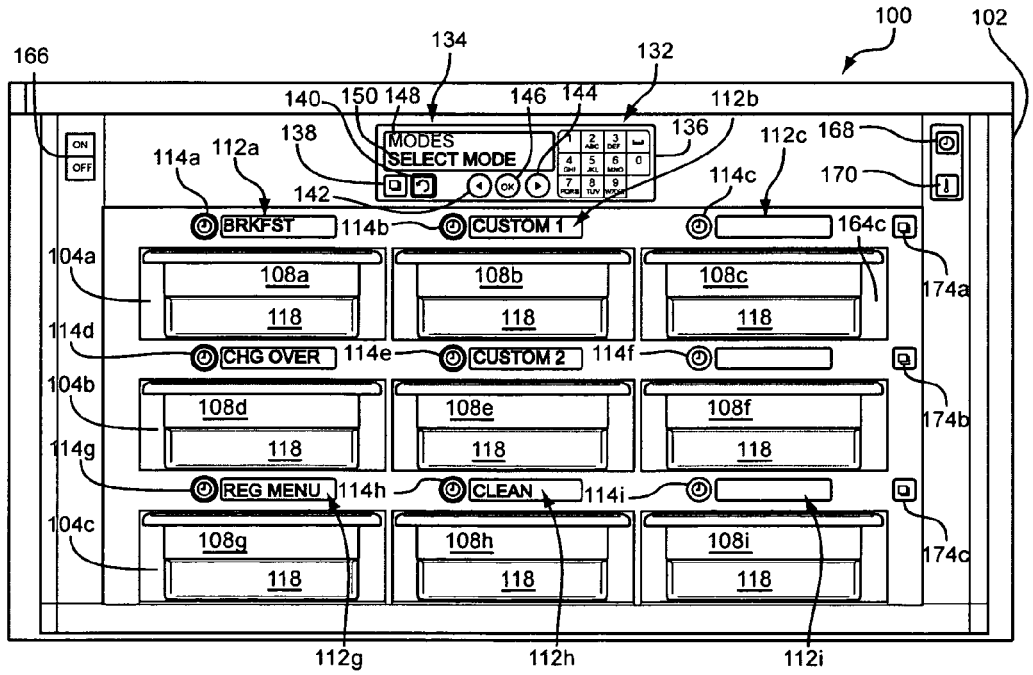
Figure 10:
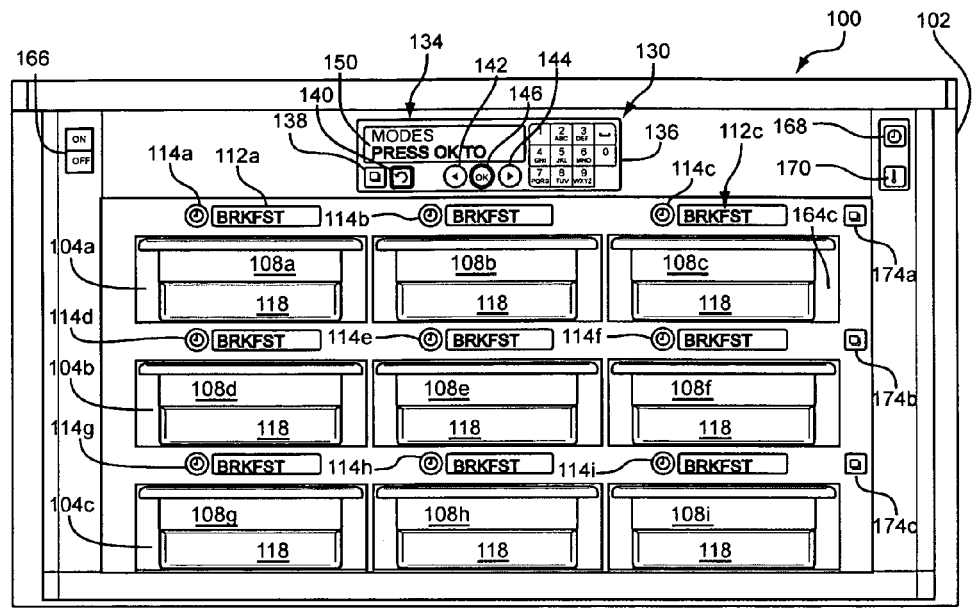
Figure 11:
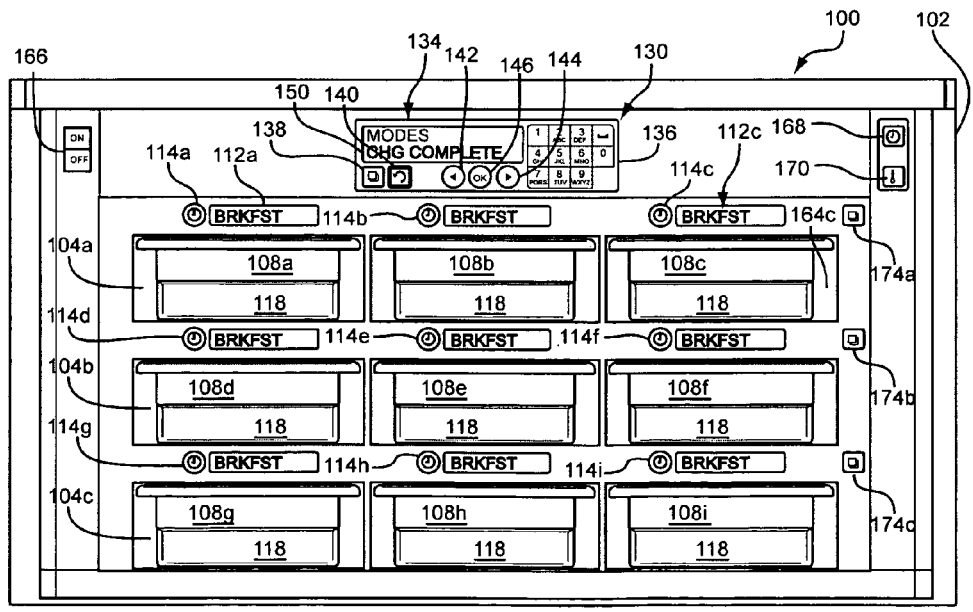

For example, selecting menu option 304 then opens Modes menu 304 having menu options Breakfast 314, Changeover 316, Regular 318, Custom 1 320, Custom 2 322 and Clean 324 as can be seen in FIGS. 5 and 9. For sake of convenience, where selection of a menu option opens another menu, both the menu option and the other menu will be denoted with the same item reference. While in menu 304, back button 140 is brightly illuminated, first line 148 indicates the status "MODES" for Modes menu 304, and second or bottom line 150 displays the instruction "SELECT MODE." If back button 140 is pressed, generally device 100 goes back one step in the programming, e.g., goes to a higher level menu or exits programming mode if in main menu 302. Selecting breakfast mode (or any of the other modes), i.e., pressing on button 114a, causes the device to prompt the user to press OK as shown in FIG. 10. As seen in FIG. 10, buttons 114 are not illuminated, but buttons 140 and 146 are brightly illuminated, while instruction message "PRESS OK TO CONFIRM MODE CHANGE" scrolls on second line 150. Pressing OK button 146 causes the operating mode to become breakfast mode and primary display screen 134 to show on line 150 the message "CHG COMPLETE" as shown in FIG. 11. Message "CHG COMPLETE" may be flashing.

Figure 12:
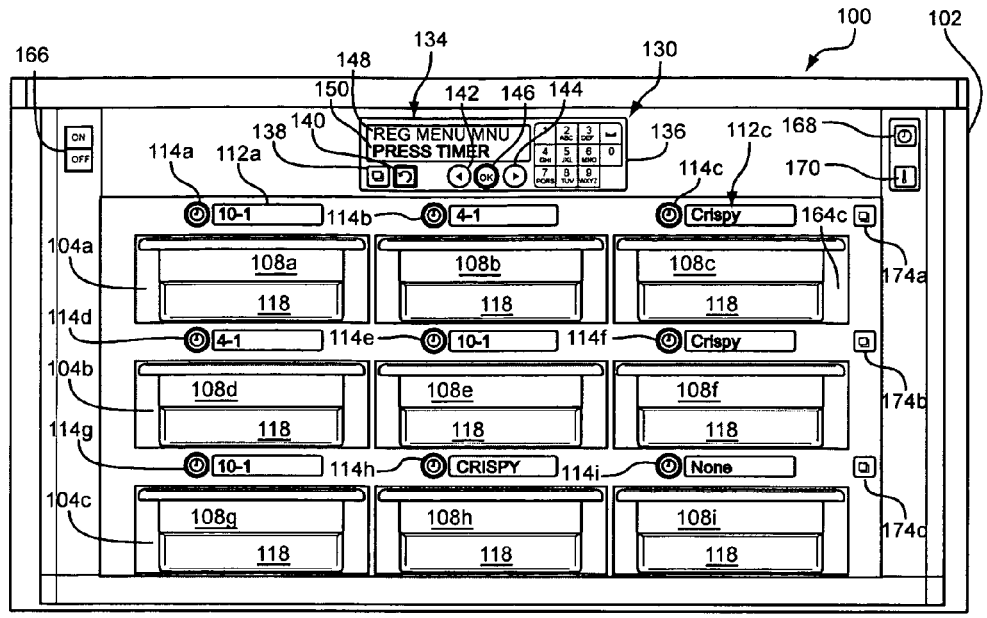

Selecting menu option Menus 306 from main menu 302 causes device 100 to display menu options Breakfast 326, Changeover 328, Regular 330, Custom 1 332 and Custom 2 334 on secondary displays 112a, 112b, 112d, 112e and 112g, respectively. Selecting one of those options causes device 100 to prompt a user to assign specific food items to all of the storage positions 108 as shown in FIG. 12. Primary display 134 indicates the status "REG[ULAR] MENU M[E]NU" in top line 148 and provides the instruction "PRESS TIMER BUTTON TO SCROLL OR OK TO SAVE" in a scrolling message in bottom line 150. Pressing button 114 (a.k.a. the item timer button) causes corresponding display 112 to show different food items. When cavity 104a, for example, is not capable of generating different environments or different settings for the control elements for different storage positions 108a, 108b and 108c within cavity 104a, it is preferable that button 114a be able to scroll through all programmed food items and buttons 114b and 114c be able to scroll only through the programmed food items that are compatible with or have the same control setting as the one shown in display 112a. Also preferably, pressing button 114a causes displays 112b and 112c to display food items compatible with the one shown in display 112a. Once all displays 112 are showing the desired food items for the operating mode selected in menu 306, a user presses OK button 146 to complete the programming. Device 100 may then look like the one depicted in FIG. 11 except that secondary displays 112 may display the assigned food items. Also, line 150 of display 134 may show a "SAVE COMPLETE" message, which may be flashing.

Figure 13:
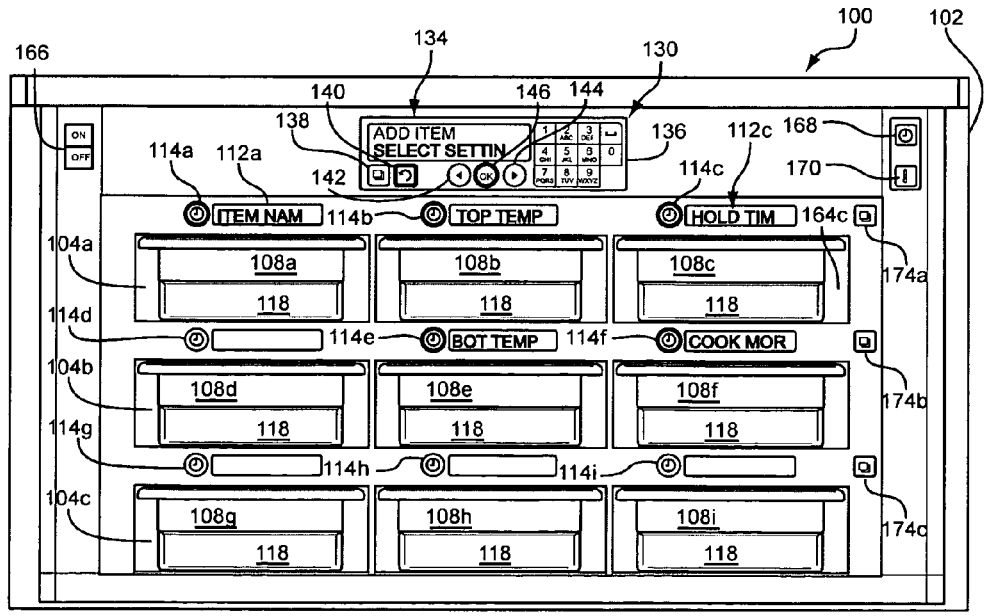
Figure 14:
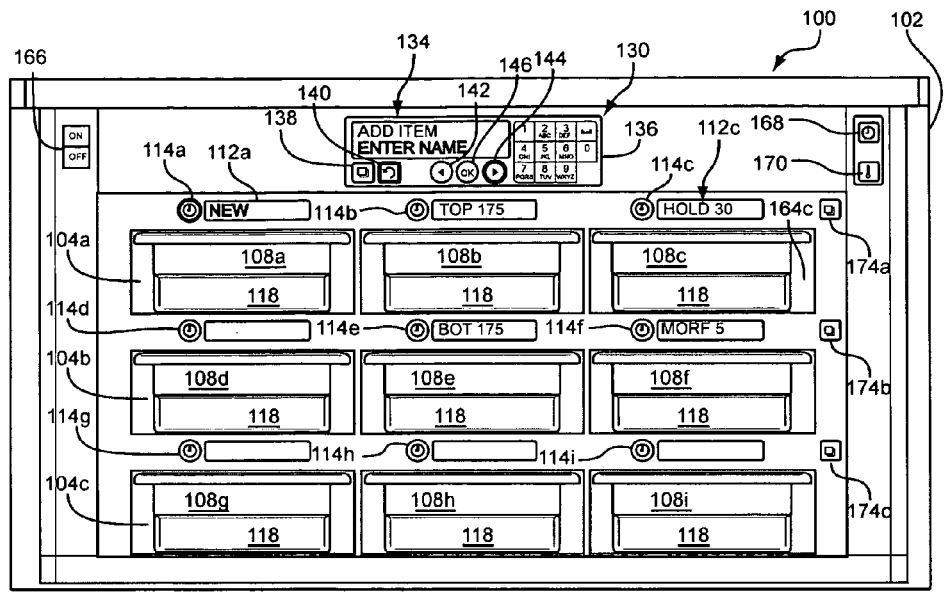

If Items menu option 308 is selected from main menu 302, secondary displays 112a, 112d, and 112g display menu options Add 336, Change 338, and Delete 340, line 148 displays the status "ITEMS" and line 150 displays the instruction "SELECT TASK." Selection of any one of options 336, 338, and 340 opens a third level of menus, which is shown in FIG. 6. Selecting Add item option 336 opens menu 336 having menu options 414, 416, 418, 420 and 422 as shown in FIGS. 6 and 13. Displays 112a, 112b, 112c, 112e and 112f display in a scrolling message the variable names to be changed (ITEM NAME, TOP TEMP, HOLD TIME, BOT TEMP and COOK MORE, respectively) and their current values. Scrolling is used when a message exceeds the capacity of display 112, first line 148 or second line 150 to display the message without scrolling. The variables can be changed by pressing associated buttons 114a, 114b, 114c, 114e and 114f and entering in the numeric or alphanumeric values for the variables via keypad 136. When a user is satisfied with the programming of the food item, the user presses OK button 146. In FIG. 14, variable ITEM NAME was selected through menu 336. In FIG. 14, secondary display 112a brightly displays the current value for the variable, which can be a default value, and associated key 114a and line 150 flash brightly. During entry of a value into one of the 5 variables, buttons 140, 142 and 144 are illuminated if applicable and the location of a cursor is noted by flashing the specific alphanumeric or numeric character where the cursor is located. Button 140 "enters" the displayed value and returns device 100 to menu 336.

Figure 15:
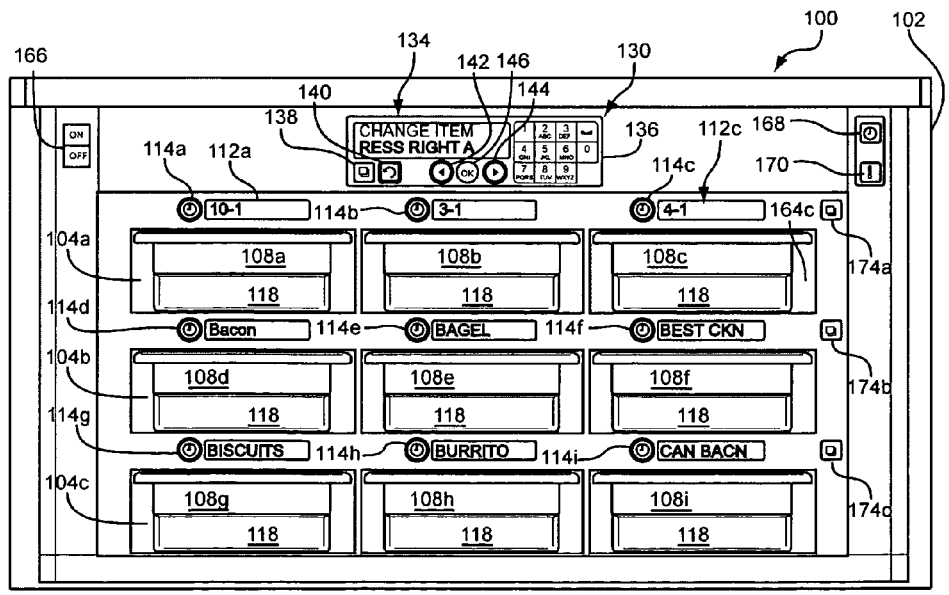
Figure 16:
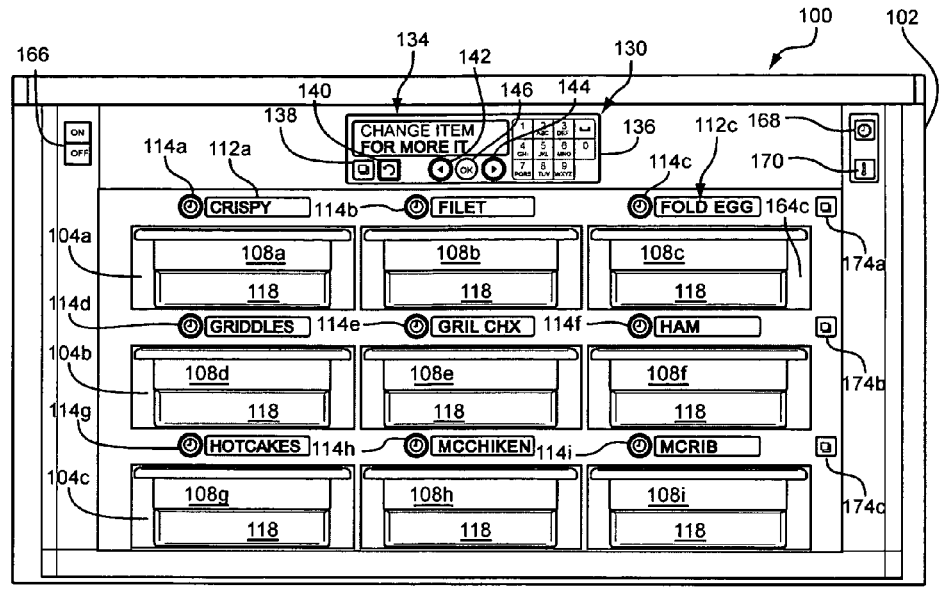
Figure 17:
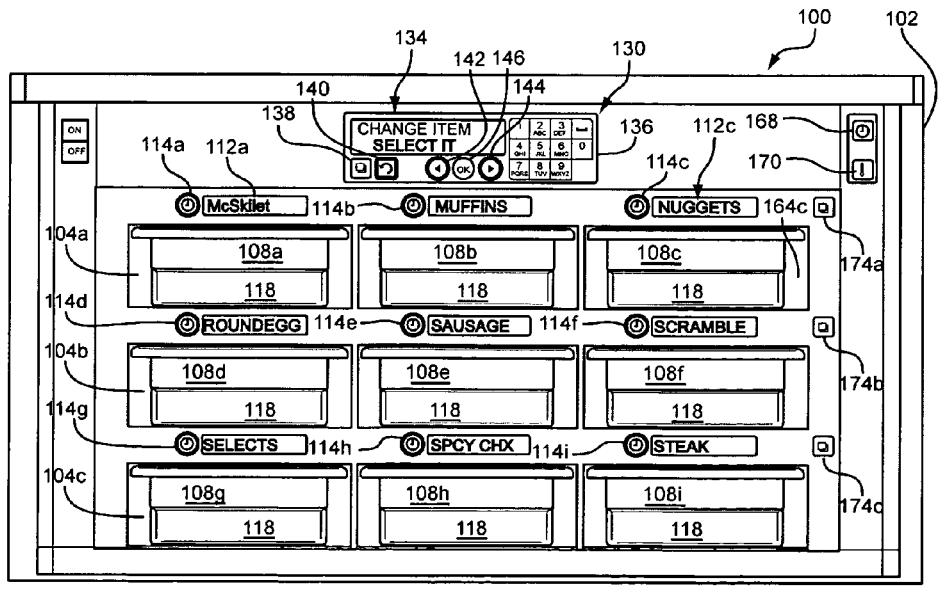

Selecting menu options 338 or 340 causes device 100 to open menus 334 and 338. Menus 338 and 340 list all the food items (item references 356-412) that have been programmed and not deleted. Frequently, the number of menu options or food items exceeds the number of secondary displays 112 available. In this case, only the number of menu options equaling the number of secondary displays 112 is displayed. Arrow buttons 142 and 144 allow a user to see the other menu options. FIGS. 15-17 show device 100 in programming menus 338 and 340. In menu 338, selecting an item allows a user to edit the programming of the selected item via menu options 414, 416, 418, 420 and 422 discussed earlier. In menu 340, selecting a food item allows a user to delete the program for the item after confirming the selection.

Figure 18:
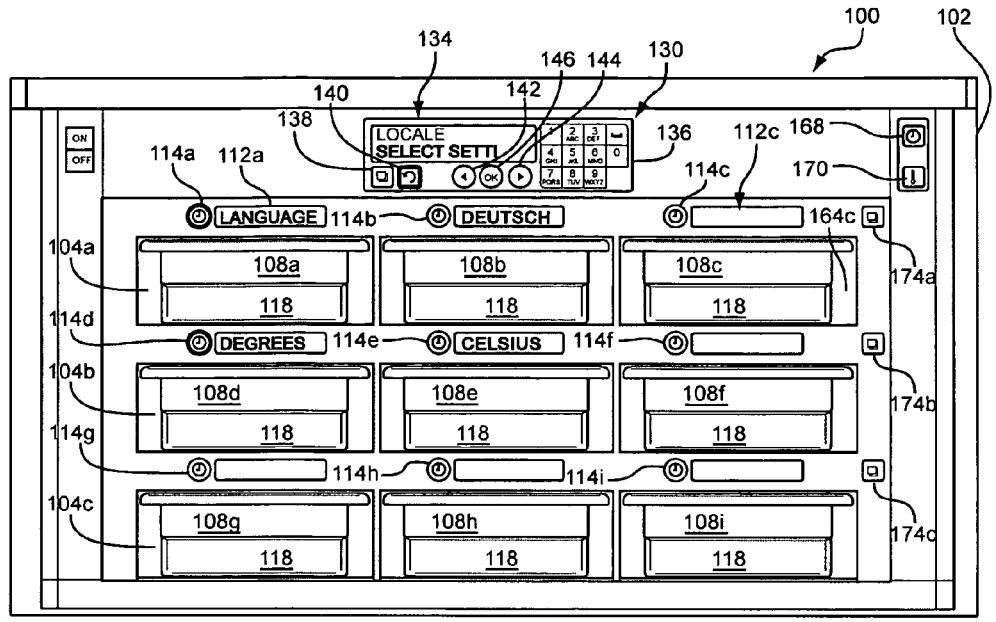
Figure 19:
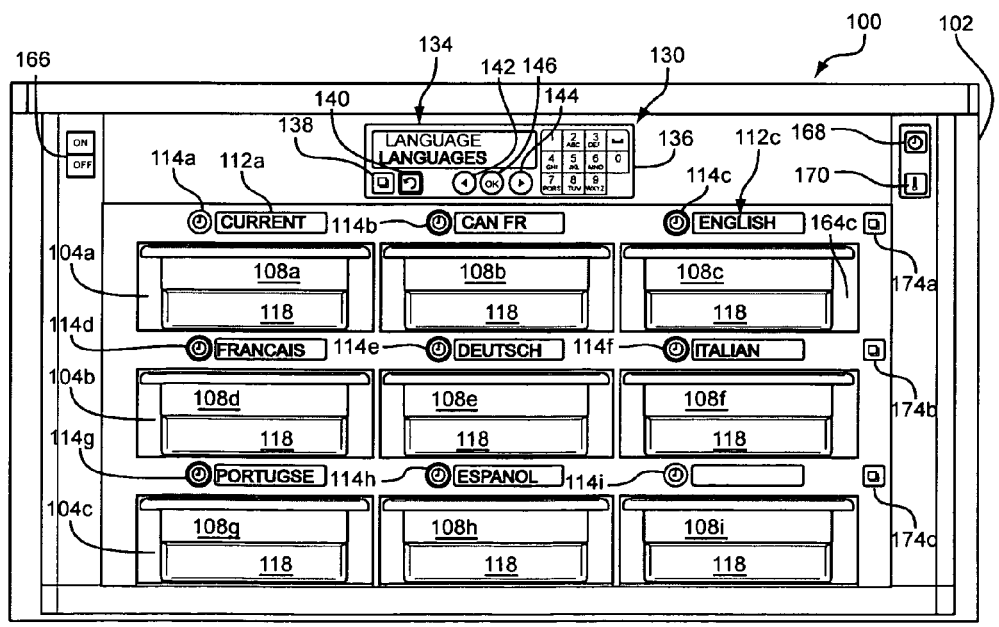

Selecting menu option Locale 310 from main menu 302 causes device 100 to progress to menu Locale 310 having options Language 342 and Degrees 344 as seen in FIG. 7. In FIG. 18, device 100 shows options Language 342 and Degrees 344 in displays 112a and 112d with current values for these options in displays 112b and 112e, respectively. Selecting language option 342 causes displays 112 to show the available language options 424-436 as shown in FIG. 19. Display 112a shows the language currently selected by a scrolling message. Conceivably, there may be more languages than available in secondary displays 112. In this case, pressing arrow keys 142 and 144 would permit a user to see the other options. Pressing button 114 associated with the display 112 showing a desired language option selects the desired language. Programming device 100 to display temperatures in Fahrenheit (menu option 440) or Celsius (menu option 442) is similar to programming the device to display in English, French or Spanish.

Selecting menu option 312 allows a user to select a volume level (menu options 346-354) for audible alarms. Audible alarms may be used in conjunction with the "COOK NOW" message shown in FIG. 4G, for example.

A few miscellaneous programming issues are now addressed. After a period of inactivity, device 100 will exit the programming mode without making any programming changes unless those changes have been confirmed. Some programming can be achieved without the hierarchy of menus 300 as discussed earlier with respect to mode button 174. During programming, displays 112 on front side 160 are used to display options or values, while displays 112 on the back side can mimic displays 112 on front side 160 or can continue to show operating status information.

Pressing master time key 168 causes displays 112a-i to display the item name and the time for associated storage positions 108a-i unless the timer is not running or any one of the associated storage positions 108a-i is not configured to hold a specific item of food. Pressing master temperature key 170 once causes the left most secondary displays 112a, 112d and 112g of each of cavities 104a-c to alternately display the temperature or settings of the upper and lower heating elements for the associated cavity 104a-c. Pressing master query keys 168 and 170 during programming temporarily causes displays 112 on the same side as the key pressed or on both front side 160 and back side 162 to show status information as described above.

As used herein, the terms "button" or "buttons" and "key" or "keys" are used interchangeably. The keys of device 100 may be of any type or construction and typically are suitable for restaurant use and may be mechanical or part of a touch screen or display screen, for example. Preferably, the keys are tactile push button. The keys of secondary input interfaces 110a-i and primary interface 132, not including those of the keypad, may be capable of being illuminated from behind in amber. Alternatively, the keys may have an associated light adjacent some or all of the keys for illuminating the keys from the front or side. Generally, the keys are illuminated to make the programming of device 100 intuitive, easy and quick. To that end, the keys are illuminated in response or responsive to a programming menu or other programming mode event when they assist with the navigation of the hierarchy of menus, in selecting a menu option or in editing a numeric or alphanumeric value. By responsive or in response, for the purposes of this disclosure, it should be understood that the illumination of keys or lights can be simultaneous to the programming mode event to which it is responsive.

In accordance with one embodiment, device 100 may have a restricted access state or states, including as to programming. Thus, device 100 may be programmed so that it either: cannot be used; can be used in a limited fashion; cannot be programmed in certain ways; or cannot be programmed at all unless a user first enters a security code. There can be levels of codes to access different states of use and/or programming functions. Device 100 can be configured to display a message on, for example, either of displays 112 or 134 to prompt a user to enter a security code and when entered correctly or incorrectly, a message indicating access or non-access is provided. Illumination of OK button 146 can be used to indicate access, for example. Such a restricted access arrangement can prevent, for example, device 100 from being programmed to operate at too low of a temperature or to permit excessive storage times.

A method for programming a food storage device is also provided. The food storage device has a plurality of food storage cavities, each cavity having at least one food storage position, an associated environmental control element for controlling the environment in the cavity, a secondary display, and a secondary key.

The method includes displaying different menu options from a hierarchy of programming menus on different secondary displays and selecting a menu option by pressing the secondary key associated with the cavity having the secondary display displaying the menu option.

The method of programming may further include illuminating the secondary key of the associated cavity having secondary displays displaying menu options responsive to the display of the menu options.

The method of programming may further include providing a second menu for programming a cavity to hold a food item under a specified environment for a specified period of time, the hierarchy of menus having the second menu. The second menu includes the following menu options: an identifier for the item to be held, a condition control element setting for the item, and a time for a timer of the station, such as a hold time. The second menu may also include a warning or "cook now" time for indicating that the item identified by the identifier should be cooked in anticipation that the hold time will expire shortly.

The method of programming includes providing a third menu having more menu options than secondary displays and a primary input interface comprising a first arrow key. The third menu is part of the hierarchy of menus. Only a portion of the different menu options of the menu are displayed when displaying the third menu and in response the first key is illuminated. The first key is pressed and a previously non-displayed option from the third menu is displayed on one of the secondary displays in response to the key press.

A method of preparing food such as a sandwich is further provided. A food storage device for holding a plurality of food items is provided. The storage device comprises a plurality of food storage cavities, each storage cavity defining a food storage volume and having an associated control element for controlling the environment in the food storage volume in which food items can be held. Each storage cavity has an associated secondary input interface for programming the device, and a secondary human-readable display for displaying a programming menu option and for displaying a status of the storage cavity.

The device may have a primary input interface, discrete from the secondary input interfaces, for permitting a user to program the plurality of cavities in cooperation with the secondary input interfaces. The device may be programmable by a hierarchy of menus comprising a plurality of the programming menu options.

Previously cooked food is placed into the storage device. The previously cooked food is stored in the storage device for a period of time and subsequently removed before a maximum hold time is reached. The previously cooked food is assembled together with another suitable sandwich component or components, which may be a bread component, to make a sandwich.

The bread component can be any bread-like food used to prepare a sandwich. Examples include a bun, whole wheat bun, multi-grain bun, bread slice, muffin, hotcake, bagel, and any other type of bread product which can be used as part of a sandwich. In the case where the food item stored in the storage device is a bread component, the other suitable sandwich component or components may be any desired meat or sandwich filling item, including, for example, a sausage patty, a cooked egg, Canadian bacon, a hamburger patty, a chicken or fish filet, vegetables, cheese, or any combinations thereof.

Optionally, additional sandwich ingredients are added to the previously cooked food or bread component to create a sandwich. Sandwich ingredients include ketchup, mustard, mayonnaise, pickle, onion, tomato, lettuce, or any other condiment or component that may be enjoyable on a sandwich.

The method of preparing food may include placing precooked food of the same type into a plurality of trays. Secondary displays indicate where food items should be placed. A plurality of trays is placed into a plurality of storage cavities or storage positions in accordance with the indications of the secondary displays at different times such that the food storage device is holding the plurality of trays at the same time. Upon placing each tray, a timer associated with the storage position or storage cavity holding the tray is initiated. The device indicates which of the plurality of trays should be used first based on the timer. The method further includes removing food items from the indicated tray instead of the other trays to incorporate into a sandwich.

The method of preparing food may include alerting a user for the need to prepare more food items based on a timer and responsively cooking more food items to be placed in the food storage device pending their incorporation into a sandwich.

The method of preparing food may also include programming the food storage device as previously described and subsequently storing food items in the storage device.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A food storage device for holding food items in a controlled environment comprising:
a plurality of discrete food storage cavities, each storage cavity defining a food storage volume and having a heater element for maintaining food items in the food storage volume at elevated temperature, each storage cavity having a different associated secondary human input interface for programming the device by a hierarchy of programming menus, and a different secondary human-readable display for displaying programming menu options and for displaying a storage cavity status, wherein the hierarchy of programming menus comprises a first-level programming menu and at least one second-level programming menu accessible by selecting a corresponding first-level menu option;
a primary human input interface, including a human-readable primary display, discrete from the secondary input interfaces, the primary input interface allowing entry into a programming mode in which the device is programmable to hold different foods at different elevated temperatures for different holding times by the hierarchy of programming menus by selecting a desired menu option with the secondary input interface that is associated with the secondary display indicative of the desired menu option.

2. The device of claim 1 further comprising a cabinet, the cabinet enclosing the plurality of food storage cavities and the primary input interface.

3. The device of claim 2 further comprising a plurality of removable food storage trays, the removable trays each configured to contain an amount of food that can be placed and contained within one of the plurality of food storage cavities.

4. The device of claim 2, each cavity having a plurality of storage positions and a cavity control button for changing a mode of the cavity.

5. The device of claim 1 wherein the primary input interface comprises a control panel having a keypad and the primary display, the primary input interface for permitting selecting a mode of operation of the device, the selected mode of operation displayed by the primary display and the secondary displays displaying information for the selected mode of operation.

6. The device of claim 4 further comprising a master query button, wherein pressing the master query button causes each secondary display to display a status for the corresponding storage position associated with that cavity.

7. The device of claim 6 wherein the status caused to be displayed is selected from the group consisting of time remaining for food in the storage positions, time lapsed for food in the storage positions, the temperature setting for the heater element and the temperature controlled by the heater element.

8. The device of claim 1 wherein the device is programmable by programming comprising selecting one of the menu options among a plurality of simultaneously displayed menu options displayed by different secondary displays.

9. The device of claim 8 wherein selecting one of the menu options comprises making an input via the secondary input interface corresponding to the secondary display displaying the selected menu option.

10. The device of claim 9 wherein each of the secondary input interfaces comprises a control button and making an input via the secondary input interface comprises pressing the button.

11. The device of claim 10 wherein the different storage cavities have an associated light adjacent the control button and the light is illuminated responsive to the display of the menu option by the corresponding secondary display.

12. The device of claim 8 wherein the hierarchy of programming menus comprises a first programming menu having a first meal mode menu option and a second meal mode menu option, the first and second meal modes being selected from the group consisting of breakfast, lunch, dinner and combinations thereof.

13. The device of claim 8 further comprising a countdown timer and wherein the hierarchy of programming menus comprises a menu for programming food items to be held by the device, the menu for programming food items comprising a name for an item, a temperature setting for the item, and an initial time for the countdown timer.

14. The device of claim 8 wherein the primary input interface comprises a first key, the hierarchy of programming menus comprises a third programming menu having a number of menu options exceeding the number of secondary displays, the device configured so that when displaying the third programming menu the first key is illuminated in response to the display and pressing the first key causes the display of a previously non-displayed option from the third programming menu.

15. The device of claim 8 further comprising a primary display adjacent the primary input interface, the primary display displaying a programming status of the device during programming mode.

16. The device of claim 1 wherein the hierarchy of programming menus further comprises a third-level programming menu accessible by selecting a corresponding second-level menu option.

17. The device of claim 5 wherein the primary input interface permits selection of a mode selected from the group consisting of programming mode, breakfast mode, regular mode and changeover mode, and the selection of a mode causes display of the mode selected on the primary display and causes at least some of the secondary displays to display information relating to the mode selected.

18. A food storage device for holding food items in a heated environment comprising:
a plurality of discrete food storage cavities, each storage cavity defining a food storage volume and having a heating element for maintaining food items in the food storage volume at elevated temperature, each storage cavity having an associated secondary input interface for programming the device, and a secondary human-readable display for displaying a programming menu option and for displaying a status of the storage cavity; and
a primary input interface, discrete from the secondary input interfaces, for permitting a user to select a program mode and to program the plurality of cavities in cooperation with the secondary input interfaces,
the device being programmable to hold different foods at different elevated temperatures for different holding times by navigation through the secondary input interfaces of a hierarchy of programming menus comprising a plurality of the programming menu options to select an alphanumeric variable for value assignment and by the assignment of a value to the selected alphanumeric variable through the primary input interface, wherein the hierarchy of programming menus comprises a first-level programming menu and at least one second-level programming menu accessible by selecting a corresponding first-level menu option.

19. The device of claim 18 wherein the device is programmable by programming comprising selecting one of the menu options among a plurality of simultaneously displayed programming menu options displayed by different secondary displays.

20. The device of claim 18 wherein each of the secondary input interfaces comprises a control button operable to start a timer indicative of an elapsed storage time of a food item in the storage cavity or a time remaining on the usable life of a food item in the storage cavity and selecting one of the menu options comprises pressing the control button corresponding to the secondary display displaying the selected menu option.

21. The device of claim 18 each cavity further comprises at least one storage position, the device programmable to hold a specific food item type for a specific time duration for each storage position, the device capable of indicating the need to cook more of the food item type upon expiration of a predetermined amount of time by displaying a need to cook more message on the secondary human-readable display associated with the storage position holding the food item type for which there is a need to cook more.

22. The device of claim 21 wherein the device is capable of displaying the need to cook more message on a plurality of the secondary human-readable displays and the cook more messages are flashed in synchronicity.

23. The device of claim 18 wherein the device is capable of indicating an expired status for expired food items that have been held in the device for longer than a maximum hold time by displaying an expired message on the secondary human-readable display associated with the storage cavity holding the expired food item.

24. The device of claim 23 wherein the device is capable of indicating the expired status for a plurality of expired food items and the expired status messages are flashed in synchronicity.

25. The device of claim 18 wherein the primary input interface comprises an alphanumeric keypad for the assignment of alphanumeric values to alphanumeric variables.

26. The device of claim 25 wherein the alphanumeric variable is a temperature or a holding time.

27. A food storage device for holding food items in a controlled environment comprising:
a plurality of discrete food storage cavities, each storage cavity defining a food storage volume and having a heater element for maintaining food items in the food storage volume at elevated temperature, each storage cavity having an associated secondary interface, each secondary interface comprising a different secondary input interface for programming the device and a secondary human-readable display for displaying categorical variable values and for displaying a status of the storage cavity;
a primary interface, discrete from the secondary interfaces, for programming the device, the primary interface comprising a primary input interface; and
a programming mode in which an alphanumeric variable is selectable for value assignment from a plurality of different alphanumeric variables simultaneously displayed on different secondary displays through input into the secondary input interfaces and responsive to the selection, the primary input interface permitting assignment of an alphanumeric value to the selected alphanumeric variable through the primary input interface; wherein the device is programmable in the programming mode to hold different foods at different elevated temperatures for different holding times.

28. The device of claim 27 wherein the primary input interface comprises an alphanumeric keypad for the assignment of alphanumeric values to alphanumeric variables.

29. The device of claim 27 wherein the primary interface comprises a human-readable primary display, the primary display displaying at least one message comprising instructions for programming while in programming mode.

30. The device of claim 29 wherein the message displayed by the primary display further comprises a programming status and one or more of the secondary displays show a programming status of the corresponding food storage cavity while the device is in programming mode.

31. The device of claim 27 wherein the alphanumeric variable to which a value is assigned can be selected by navigating a hierarchy of programming menus.

32. The device of claim 27 wherein the device is further programmable in the programming mode by selecting a categorical variable for value assignment through the secondary input interfaces and by selecting a categorical value for the selected categorical variable through the secondary input interfaces.

33. The device of claim 32 wherein the categorical variable and the alphanumeric variable can be selected for value assignment by navigating a hierarchy of programming menus.

34. The device of claim 32 wherein the selection of a categorical value is made among a plurality of simultaneously-displayed categorical values displayed on different secondary displays.

35. The device of claim 34 wherein the selection of a categorical value comprises making an input into the secondary input interface of the secondary display displaying the value to be selected.

36. The device of claim 35 wherein the secondary interfaces displaying the simultaneously-displayed categorical variables are illuminated responsive to the displaying.

37. The device of claim 28 wherein the alphanumeric variable comprises a temperature, a name of a food item, or a holding time.

38. The device of claim 27 wherein any one of the simultaneously displayed alphanumeric variables is selectable by an input into the second interface corresponding to the secondary display displaying the alphanumeric variable.

39. The device of claim 38 wherein the secondary input interface for each cavity is operable to start a timer indicative of an elapsed storage time of a food item in the storage cavity or a time remaining on the usable life of a food item in the storage cavity.

40. A food storage device for holding food items in a controlled environment comprising:
  a plurality of discrete food storage cavities, each storage cavity defining a food storage volume and having a heater element for maintaining food items in the food storage volume at elevated temperature, a plurality of secondary human input interfaces for programming the device by a hierarchy of programming menus, and a plurality of secondary human-readable displays for displaying programming menu options and for displaying a storage cavity status, each cavity associated with one of the secondary human input interfaces and one of the secondary human-readable displays, wherein the hierarchy of programming menus comprises a first-level programming menu and at least one second-level programming menu accessible by selecting a corresponding first-level menu option;
  a primary human input interface, including a human-readable primary display, discrete from the secondary input interfaces, the primary input interface allowing entry into a programming mode in which the device is programmable to hold different foods at different elevated temperatures for different holding times by the hierarchy of programming menus by selecting a desired menu option with the secondary input interface that is associated with the secondary display indicative of the desired menu option.

41. A method for programming a food storage device having a plurality of food storage cavities, each cavity having at least one food storage position and a heater element for maintaining food items in the cavity at elevated temperature, a primary input interface having a first key, each cavity having an associated secondary display and a secondary key associated with the secondary display, the device being programmable by a hierarchy of programming menus to hold different foods at different temperatures for different holding times wherein the hierarchy of programming menus comprises a first-level programming menu and at least one second-level programming menu, the method comprising:
  selecting a programming mode by pressing the first key to cause displaying simultaneously different menu options from the hierarchy of programming menus on different secondary displays, and
  selecting a menu option from the simultaneously displayed different menu options by pressing the secondary key associated with the secondary display displaying the menu option.

42. The method of programming of claim 41 further comprising illuminating the secondary keys associated with the secondary displays displaying menu options responsive to the display of the menu options.

43. The method of programming of claim 41 wherein the hierarchy of menus comprises a third programming menu having more menu options than secondary displays and the primary interface has a second key,
  wherein displaying different menu options from a hierarchy of programming menus on different secondary displays comprises displaying different menu options of the third programming menu, further comprising
  illuminating the second key in response to displaying the third programming menu,
  pressing the second key, and
  displaying a previously non-displayed option from the third programming menu on one of the secondary displays in response to pressing the second key.

44. The method of claim 41 further comprising accessing the second-level programming menu by selecting a corresponding first-level menu option.

45. The method of claim 44 wherein the hierarchy of programming menus further comprises a third-level programming menu, the method further comprising accessing one of the third-level programming menus by selecting a corresponding second-level menu option.

46. The method of claim 41 wherein the secondary key for each cavity is operable to start a timer indicative of an elapsed storage time of a food item in the storage cavity or a time remaining on the usable life of a food item in the storage cavity.

47. The method of programming of claim 41 wherein the hierarchy of programming menus comprises a menu for programming food items to be held by the device, the menu for programming food items comprising an identifier for the item to be held, a heater control element setting for the item, and a food item holding time, wherein the selecting a menu option selects the menu for programming food items.

48. A method for programming a food storage device having a plurality of food storage cavities, each cavity having at least one food storage position and a heater element for maintaining food items in the cavity at elevated temperature, a primary input interface having a first key, each storage cavity having a secondary interface, the secondary interface comprising a secondary input interface and a secondary display, the device being programmable in a programming mode to hold different foods at different temperatures for different holding times, the method comprising in the programming mode:
  simultaneously displaying a plurality of alphanumeric variables on different secondary displays;

selecting one of the plurality of simultaneously displayed alphanumeric variables for value assignment through the secondary input interfaces; and assigning an alphanumeric value to the selected alphanumeric variable through the primary input interface.

49. The method of claim 48 wherein the primary input interface comprises an alphanumeric keypad and wherein the assigning comprises entering an alphanumeric value through the alphanumeric keypad.

50. The method of claim 48 wherein the device further comprises a primary human-readable display, the method further comprising displaying a programming status while in programming mode on the primary display.

51. The method of claim 48 wherein selecting the alphanumeric variable comprises navigating a hierarchy of programming menus, wherein the hierarchy of programming menus comprises a first-level programming menu and at least one second-level programming menu accessible by selecting a corresponding first-level menu option.

52. The method of claim 48 further comprising selecting a categorical variable for value assignment through the secondary input interfaces and selecting a categorical value for the selected categorical variable through the secondary input interfaces.

53. The method of claim 52 wherein selecting the alphanumeric variable comprises navigating a hierarchy of programming menus and selecting the categorical variable comprises navigating the hierarchy of programming menus, wherein the hierarchy of programming menus comprises a first-level programming menu and at least one second-level programming menu accessible by selecting a corresponding first-level menu option.

54. The method of claim 52 further comprising simultaneously displaying a plurality of categorical values on different secondary displays responsive to the selection of the categorical variable, wherein the categorical variable is selected from the plurality of simultaneously-displayed categorical values.

55. The method of claim 54 wherein the selecting the categorical value further comprises making an input into the secondary input interface associated with the secondary display displaying the value to be selected.

56. The method of claim 55 wherein the secondary interfaces displaying the simultaneously-displayed categorical variables are illuminated responsive to the displaying.

57. The method of claim 48 wherein the secondary input interface for each cavity is operable to start a timer indicative of an elapsed storage time of a food item in the storage cavity or a time remaining on the usable life of a food item in the storage cavity.

58. The method of claim 49 wherein the alphanumeric variable comprises a temperature, a name of a food item, or a holding time.

59. The method of claim 48 wherein the alphanumeric variable is selected by making an input into the second input interface corresponding to the secondary display displaying the alphanumeric variable.

60. A method for programming a food storage device having a plurality of food storage cavities, each cavity having at least one food storage position and a heater element for maintaining food items in the cavity at elevated temperature, comprises a primary human-readable display, a primary input interface having a first key, each storage cavity having a secondary interface, the secondary interface comprising a secondary input interface, a programming mode in which the device is programmable to hold different foods at different temperatures for different holding times, the method comprising:

selecting an alphanumeric variable for value assignment through the secondary input interfaces;

assigning an alphanumeric value to the selected alphanumeric variable through the primary input interface;

displaying a programming status while in programming mode on the primary display; and displaying instructions for programming while in programming mode on the primary display.

* * * * *